Jan. 23, 1962 P. BONNAFOUX 3,017,845
PELLET MILL
Filed Aug. 25, 1958 3 Sheets-Sheet 1

PAUL BONNAFOUX
INVENTOR.

BY Thomas T. Mahoney

ATTORNEY

Jan. 23, 1962    P. BONNAFOUX    3,017,845
PELLET MILL
Filed Aug. 25, 1958    3 Sheets-Sheet 2

PAUL BONNAFOUX
INVENTOR.

BY Thomas T. Mahoney

ATTORNEY.

Jan. 23, 1962   P. BONNAFOUX   3,017,845
PELLET MILL
Filed Aug. 25, 1958   3 Sheets-Sheet 3
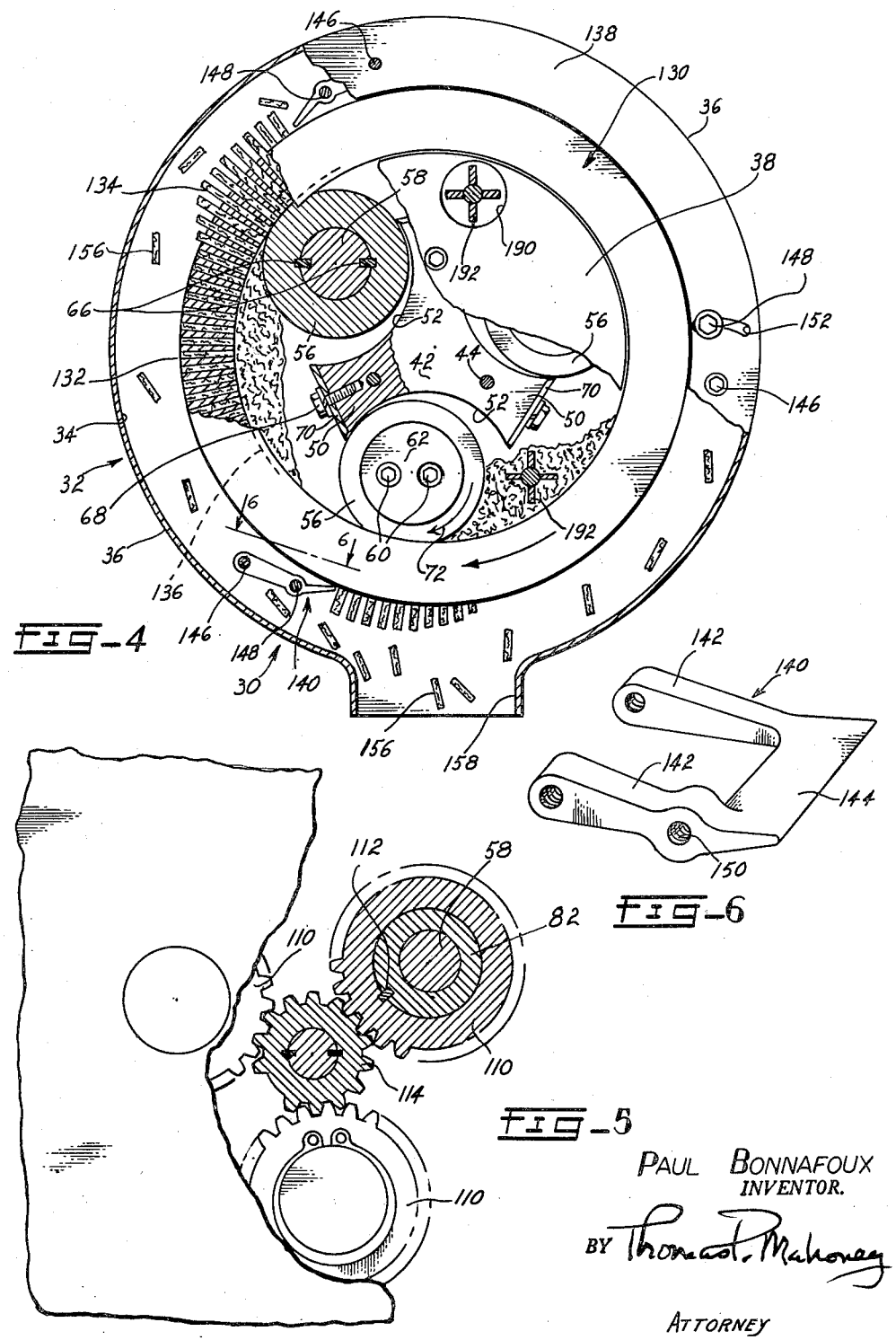
PAUL BONNAFOUX
INVENTOR.
BY Thomas P. Mahoney
ATTORNEY United States Patent Office 3,017,845
Patented Jan. 23, 1962

3,017,845
PELLET MILL
Paul Bonnafoux, 44409 Stanridge Ave., Lancaster, Calif., assignor of twenty percent to Thomas P. Mahoney, Los Angeles, Calif., twenty-six percent to Marie B. Bonnafoux, Lancaster, Calif., and twenty-six percent to Yvonne Bonnafoux
Filed Aug. 25, 1958, Ser. No. 757,078
8 Claims. (Cl. 107—14)

This invention relates to a rotary pellet mill and, more particularly, to a pellet mill wherein various types of material, such as animal feeds, are fed into the mill and extruded thereby in the shape of hard, homogeneous pellets of cylindrical cross section.

Conventional rotary pellet mills usually include a rotary die member which is driven by a drive shaft upon which it is mounted and which encompasses one or more rotary extrusion rollers which are mounted internally of the rotary die and which engage the interior diameter thereof to extrude material through radial die openings formed in the wall of the rotary die.

In the pellet mill of the present invention, I have incorporated the teachings of my copending application, Serial No. 567,670, filed February 24, 1956, for a "Rotary Pellet Mill," now Patent No. 2,870,481, issued January 27, 1959, wherein there is utilized a plurality of extrusion rollers which are individually driven from a common drive source and which are adapted to support the rotary die. Since the extrusion rollers constitute both the driving means for the rotary die and the sole support therefor, the accurate adjustment of the rotary extrusion rollers with respect to the interior diameter of the rotary die with which they are associated becomes of paramount importance.

It is, therefore, an object of my invention to provide a pellet mill of the aforementioned character incorporating adjustment means whereby the extrusion rollers may be adjusted inwardly or outwardly with respect to the adjacent interior diameter of the rotary die in order that proper location of the surfaces of the individual extrusion rollers with respect to the rotary die may be accomplished.

Another object of my invention is the provision, in a pellet mill of the aforementioned character, of adjustment means for the extrusion rollers which may be energized simultaneously from a common adjustment member so that equal and simultaneous adjustment of the extrusion rollers may be accomplished.

Because of the fact that a plurality of extrusion rollers is provided within the rotary die, the delivery of material to be extruded by the conjoint action of the extrusion rollers and the rotary die is somewhat more difficult than the problem encountered in conventional pellet mills and to overcome the tendency which exists to starve one or more of the extrusion rollers, I have provided a feeding mechanism as a part of the pellet mill itself whereby uniformly measured amounts of material to be extruded through the rotary die are delivered into the chamber constituted by the housing of the pellet mill immediately adjacent the rotary die through material inlet openings provided in the housing.

Another object of my invention is the provision of a pellet mill of the aforementioned character wherein the material feeding means includes a plurality of rotatable feeding members whose inner extremities project through the material inlet openings in the housing and into the chamber defined thereby to locate said inner extremities immediately adjacent the peripheries of the individual extrusion rollers, thus insuring an adequate supply of material to be extruded at all times.

During the pellet extruding process, a considerable amount of "fines" which are constituted by material that has not been extruded by the conjoint action of the extrusion rollers and the rotary die tends to accumulate within the chamber defined by the pellet mill housing and such accumulations are a frequent cause of the failure of conventional pellet mills to operate since the accumulated "fines" reach such proportions that they cause binding of the rotary die and the associated extrusion rollers within the housing of the pellet mill.

Another object of my invention is the provision of a pellet mill of the aforementioned character which includes means disposed in fluid communication with the interior of the chamber defined by the pellet mill housing whereby the aforementioned "fines" and other similar accumulations within the interior of the housing are immediately withdrawn therefrom for distribution to a storage center or for re-circulation through the material feeding means of the pellet mill.

A further object of my invention is the provision, in a pellet mill of the aforementioned character, of exhaust means constituted by a vacuum pump adapted to create a negative pressure area across the lower portion of the chamber defined by the pellet mill housing in order to accomplish the exhaustion of "fines" therefrom.

Of course, the rotary pellet mill of my invention accomplishes its desired function by extruding material through the radial die openings in the rotary die and it is necessary to provide a plurality of cutters in the chamber defined by the pellet mill housing in order to form the individual pellets from the extruded material.

A further object of my invention is the provision, in a rotary pellet mill, of a plurality of pivotally mounted cutters, said cutters being pivotally suspended from the pellet mill housing in proximity to the perimeter of the rotary die and incorporating an externally located adjustment means adapted to facilitate pivotal movement of the individual cutters toward or away from the perimeter of the rotary die in order to determine the ultimate length of the pellets formed thereby.

Other objects and advantages of my invention will be apparent from the following specification and the accompanying drawings which are for the purpose of illustration only and in which:

FIG. 4 is a vertical, sectional view taken on the broken line 4—4 of FIG. 2;

FIG. 5 is an enlarged, fragmentary, sectional view taken on the broken line 5—5 of FIG. 2;

FIG. 6 is a perspective view of one of the cutters incorporated in the pellet mill of my invention.

Figure 1:
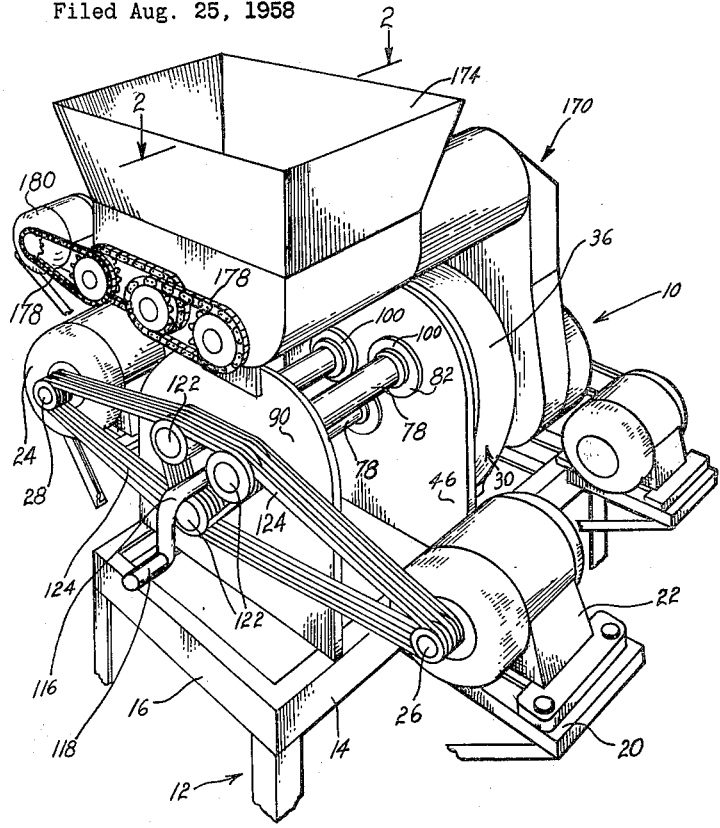
FIG. 1 is a perspective view showing a pellet mill constructed in accordance with the teachings of my invention.
Figure 2:
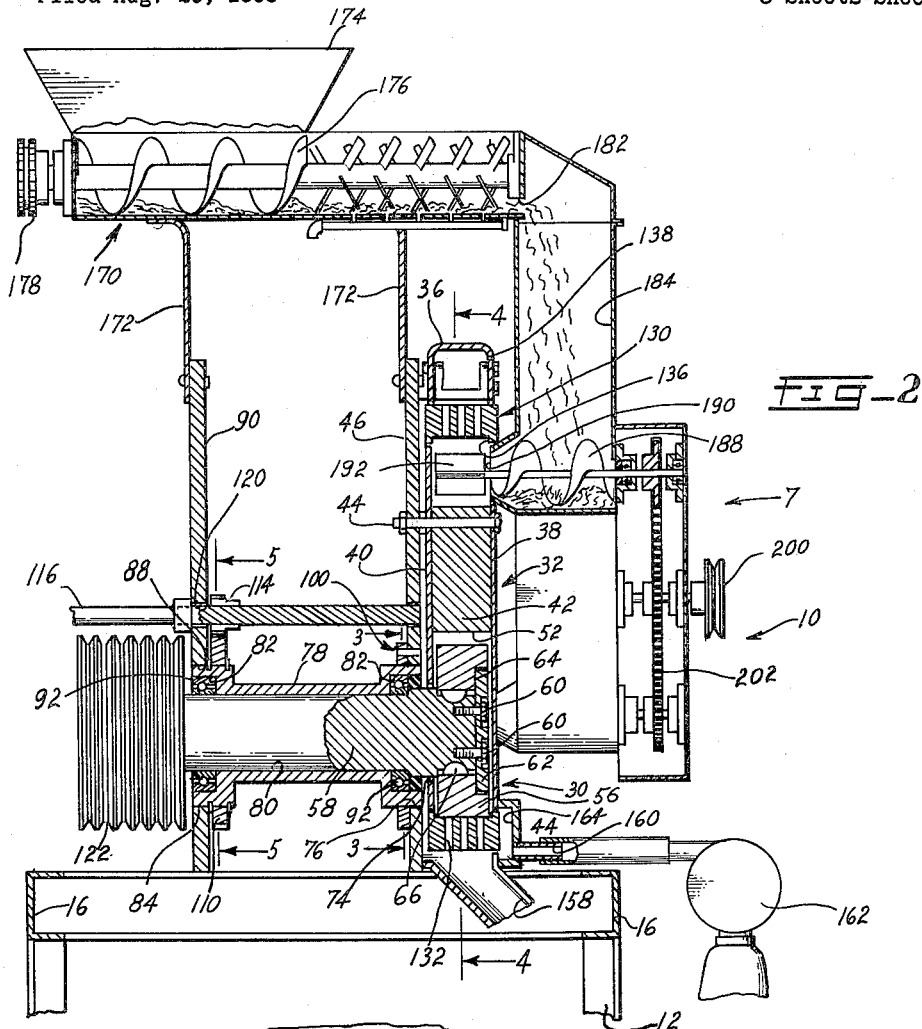
FIG. 2 is a transverse, sectional view taken on the broken line 2—2 of FIG. 1.

Referring to the drawings and particularly to FIGS. 1–2 thereof, I show a pellet mill 10 constructed in accordance with the teachings of my invention, said pellet mill being mounted on a bed 12. The bed 12 includes a pair of longitudinally oriented channel members 14 which are connected at their opposite extremities by transversely oriented channels 16.

Mounted upon lateral extensions 20 of the bed 12 are electric drive motors 22 and 24 which respectively drive sheaves 26 and 28. The function of the drive motors 22 and 24 will be described in greater detail hereinbelow.

Also mounted upon the bed 12 is the housing 30 of the pellet mill 10 which, as best shown in FIGS. 1, 2 and 4 of the drawings, includes a substantially circular portion 32 defining a chamber 34, said circular portion having a perimetrical, circular wall 36, a front wall 38, and a rear wall 40. The circular portion 32 of the pellet mill housing 30 has a partition member 42 mounted in and centrally of the chamber 34 defined thereby, said partition member being secured in operative relationship with the circular portion 32 of the pellet mill housing 30 by means of bolts 44 which extend through the front and rear walls 38 and 40, respectively, of said circular portion and which pass through a mounting plate 46 whose lower extremity is welded, or otherwise secured, to the bed 12.

The partition member 42 incorporates three radially extending legs 50 which define three recesses 52 having arcuate walls of gradually increasing radius, for a purpose which will be described in greater detail below. Mounted within the chamber 34 is a plurality of extrusion rollers 56, each roller, as best shown in FIGS 2 and 4 of the drawings, being secured in operative engagement with the extremity of an associated drive shaft 58 by means of bolts 60 which are threaded into the extremity of the associated drive shaft 58 and which secure a retainer plate 62 in operative engagement with said extremity of said drive shaft and a shoulder 64 formed in the side of the roller 56. Key members 66 serve to maintain the extrusion roller 56 against rotation relative to the associated shaft 58.

It will be noted that each of the rollers, as best shown in FIGS. 2 and 4 of the drawings, is located in one of the recesses 52 defined by the radially extending legs 50 of the partition member 42 and that the arcuate walls defining the recesses 52 have the perimeters of the extrusion rollers 56 juxtaposed thereto only at the portions of said walls adjacent one of the legs 50 defining an associated recess 52. Mounted upon the extremities of the legs 50 by means of bolts 68 are cutters 70 which serve, by impinging upon the perimeter of an associated extrusion roller 56 to clear material impacted thereupon from the perimeter thereof.

However, as the rollers 56 are rotated upon the associated drive shafts 58 in a clockwise direction as indicated by the arrow 72 in FIG. 4 of the drawings, the side walls defining the recesses 52 are spaced inwardly from the perimeters of the rollers 56, thus preventing the possibility that the rollers 56 may bind upon said arcuate side walls and lock said rollers against rotation. Such binding of the rollers 56 would occur if sufficient space was not provided between the perimeters of the rollers 56 and the walls defining recesses 52 to prevent material being pelletized from jamming in the spaces between the rollers 56 and said side walls.

Figure 3:
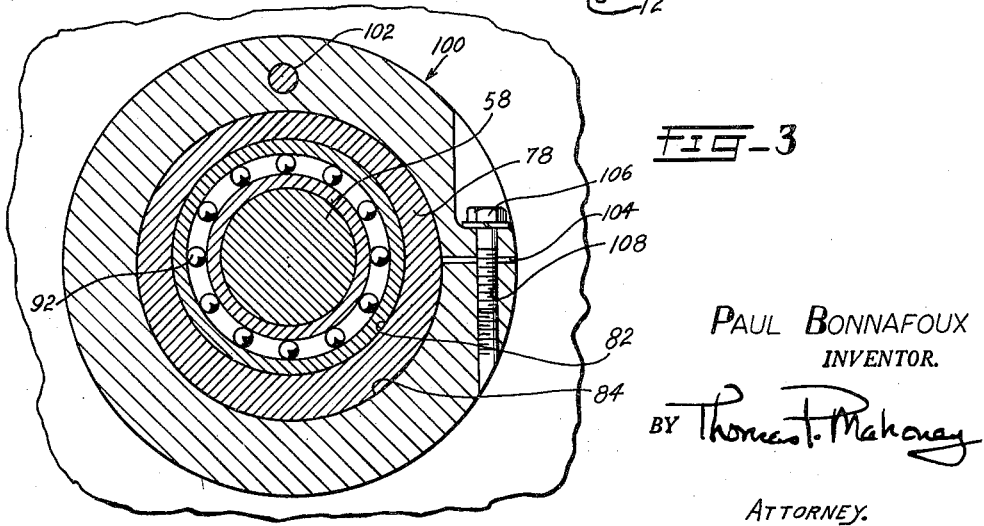
FIG. 3 is an enlarged, fragmentary, sectional view taken on the broken line 3—3 of FIG. 2.

The drive shafts 58 of the rollers 56 project through openings 74 and 76 in the back wall 40 of the circular portion 32 of the pellet mill housing 30 and the mounting plate 46, respectively. An elongated sleeve 78 encompasses each of the drive shafts 58 and has an elongated bore 80 for the reception of the associated drive shaft 58. Bearing receptacles 82 are provided on the opposite extremities of the sleeve 78, the side walls 84 of said bearing receptacles being eccentrically formed with respect to the longitudinal axes of the drive shaft 58 and sleeve 78, as best shown in FIGS. 2 and 3 of the drawings.

The right-hand bearing receptacle 82, as best shown in FIG. 2 of the drawings, is mounted in the opening 76 in the mounting plate 46 for relative rotation in respect thereto, while the left-hand bearing receptacle 82 is mounted for rotation in an opening 88 in a supporting wall 90 whose lower extremity is secured to the bed 12. Bearings 92 are mounted in the bearing receptacles 82 and serve to permit relative rotation between the drive shaft 58 and the associated sleeve 78 therefor.

It is, therefore, obvious that the rotation of the sleeve 78 with reference to an associated drive shaft 58 will cause rotation of the bearing receptacles 82 and the eccentrically formed side walls 84 thereof, thus shifting the drive shaft 58 radially with respect to the center of the chamber 34 in the circular portion 32 of the pellet mill housing 30 to adjust the roller 56 with reference to the center of the chamber 34, for a purpose which will be described in greater detail below.

Mounted in encompassing relationship with each of the right-hand bearing receptacles 82 and engaging the eccentric side wall 84 thereof is a locking collar 100 which is maintained in operative relationship with the mounting plate 46 by means of a pin 102.

Each locking collar 100 is split, as at 104, as best shown in FIG. 3 of the drawings, and a locking bolt 106 is provided which is adapted by engagement of its threaded shank in a correspondingly threaded bore 108 to clamp the locking collar 100 in operative engagement with the associated bearing receptacle 82 to prevent relative rotation of the bearing receptacle with respect to the mounting plate 46 and the supporting wall 90.

Secured in operative relationship with each of the bearing receptacles 82 and the left-hand ends of the sleeves 78 is a gear 110, said gear being retained against rotation relative to the bearing receptacle 82 by means of a key 112, as best shown in FIG. 5 of the drawings, and being engaged by a centrally located drive gear 114 which is secured to an adjustment shaft 116 which, as best shown in FIG. 1 of the drawings, has a handle 118 formed integrally therewith. The adjustment shaft 116 extends through a corresponding opening 120 in the supporting wall 90 and rotation thereof by means of the handle 118 is adapted to cause corresponding rotation of the drive gear 114 and the gears 110 on the bearing receptacles 82 which are in mesh therewith. If desired, the drive gear 114 can be released from driven relationship with the shaft 116 by sliding it out of engagement with the associated gears 110 so that individual rotation of the gears 110 by rotation of the sleeves 78 may be accomplished.

Therefore, if it is desired to adjust the shafts 52 simultaneously to accomplish inward or outward movement of the rollers 56 with respect to the chamber 34 of the circular portion 32 of the pellet mill housing 30, the locking collars 100 are released from operative relationship with the associated bearing receptacles 82 by releasing the locking bolts 106. Thus, the bearing receptacles 82 and the eccentric side walls 84 thereof engaged in the respective openings 76 and 88 in the mounting wall 46 and supporting wall 90 are free to rotate in said openings. Therefore, when the handle 118 of the adjustment shaft 116 is grasped, corresponding rotation of the gears 114 and 110 will take place causing simultaneous and concomitant rotation of the adjustment sleeves 78 which cause the drive shafts 58 to be adjusted radially with respect to the chamber 34 to cause corresponding adjustment of the extrusion rollers 56.

Each of the drive shafts 58 has a sheavel 122 mounted thereupon and multiple drive belts 124 are engaged upon the sheaves 26 and 28 respectively of the drive motors 22 and 24 to cause rotation of the extrusion rollers 56 within the chamber 34.

Mounted upon the extrusion rollers 56 is a rotary die 130, said rotary die including a plurality of die openings 132 for the extrusion of material therethrough in the form of cylindrical bars 134, as best shown in FIG. 4 of the drawings. The rotary die 130 includes a continuous groove or track 136 on its interior diameter, the side walls of which embrace the contiguous edges of the extrusion rollers 56 in order to properly align the rotary die 130 with the extrusion rollers 56. Therefore, when the extrusion rollers 56 are rotated by the drive motors 22 and 24, corresponding rotation of the rotary die 130 will take place causing the extrusion rollers 56 to extrude cylindrical bars 134 of material through the die openings 132.

Mounted on the radially extending flanges 138 of the perimetrical circular wall 36 are pellet cutters 140 which, as best shown in FIGS. 4 and 6 of the drawings, include laterally spaced mounting arms 142 terminating in a cutter blade 144. The laterally spaced mounting arms are pivotally mounted on bolts 146 extending through the radial walls 138 of the perimetrical circular wall 36 and an adjustment bolt 148 is threaded into a corresponding opening 150 in the cutter 140 and has its shank extending through an arcuate adjustment slot 152 in the radial side wall 138 whereby, when the adjustment bolt 148 is loosened, the shank thereof may be moved in the slot 152 to cause corresponding inward or outward movement of the cutter blade 144 toward or away from the perimeter of the rotary die 130 in order to cause the lengthening or shortening of the pellets 156 broken from the extruded tubular rods 134.

When the pellets 156 are severed by the cutters 140, they fall through a discharge opening 158 and are conveyed by conveyor means, not shown, to an appropriate storage or packing area.

An exhaust port 160 is connected to a vacuum pump 162 of conventional construction, as best shown in FIG. 2 of the drawings, said vacuum pump and exhaust port being adapted to exhaust dust and other materials drawn into an exhaust chamber 164 at the bottom of the pellet mill housing 30. By exhausting surplus material such as dust and other fine materials in this manner, the impaction of the material against the drive and extrusion rollers 56 and the consequent immobilzation of the pellet mill 10 are eliminated. The exhaust chamber 164 communicates with the chamber 34 through the gap between the adjoining inner periphery of the die 130 and the periphery of the wall 38.

Figure 7:
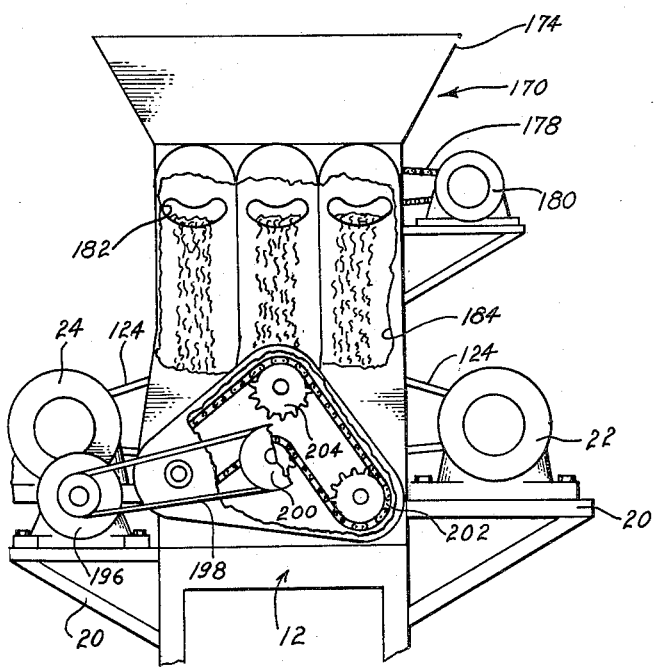
FIG. 7 is a partly sectional view taken from the direction of the arrow 7 of FIG. 2.

Mounted in operative relationship with the pellet mill assembly 10 by means of brackets 172 is the feeding portion 170 of the pellet mill 10, said feeding portion including a hopper 174 which has a plurality of axially extending screws 176 communicating therewith, said screws being driven by chains 178 energized by a motor 180. Thus, material to be extruded is fed from the hopper 174 through discharge openings 182 into vertical feed passages 184, as best shown in FIGS. 2 and 7 of the drawings. From the individual vertical feed passages 184 the material to be extruded is transported horizontally by means of screws 188 which extend through feed openings 190 in the front wall 38 of the pellet mill housing 30. The screws 188 terminate in paddles 192 juxtaposed to the individual extrusion rollers 56. The screws 188 are driven by an electric motor 196 through a belt 198 entrained upon a sheave 200 which, in turn, drives a chain 202 connected to sprockets 204 which, in turn, drive the screws 188.

By providing the feeding portion 170 as an integral part of the pellet mill 10, it is possible to regulate the feeding of material to the individual feed inlet openings 190. In this manner, the possibility that excessive or inadequate amounts of material to be extruded may be fed to the individual extrusion rollers 56 is eliminated.

I thus provide by my invention a pellet mill which is adapted to extrude much larger quantities of pellets than conventional pellet mills of the same power consumption and which, in addition, can have the extrusion rollers thereof adjusted simultaneously without the necessity for dismantling the pellet mill. Other advantages of the construction will have been made apparent from the disclosures hereinabove.

I claim:

1. In a rotary pellet mill, the combination of: a housing defining a chamber and having a plurality of inlet openings therein communicating with said chamber, said chamber having a discharge outlet for pellets and an exhaust opening; a circular die in said chamber above said discharge outlet; a plurality of extrusion rollers located in said chamber and encompassed by said die, one of said rollers being located adjacent each of said inlet openings to receive pelletizable material therefrom; a rotatable feed member extending through each of said openings and into said chamber for feeding pelletizable material to an associated roller; and an exhaust member connected to said exhaust opening adjacent said die for exhausting surplus material therefrom.

2. In a rotary pellet mill, the combination of: a housing defining a chamber and having a plurality of inlet openings therein communicating with said chamber, said chamber having a discharge outlet for pellets and an exhaust opening; a circular die in said chamber; a plurality of extrusion rollers located in said chamber and encompassed by said die, one of said rollers being located adjacent each of said inlet openings to receive pelletizable material therefrom; a rotatable feed member extending through each of said openings and into said chamber for feeding pelletizable material to an associated roller; and an exhaust member connected to said exhaust opening adjacent said die for exhausting surplus material therefrom, said exhaust member being constituted by a vacuum pump adapted to create a sub-atmospheric pressure across the bottom of said chamber.

3. In a rotary pellet mill, the combination of: a housing including a plurality of walls defining a chamber and one of said walls incorporating a plurality of openings; a plurality of extrusion rollers in said chamber each located adjacent one of said openings and mounted on a drive shaft extending through the associated opening; adjustment sleeves having portions encompassing said shafts, said sleeves being located externally of said chamber and said portions being eccentric to the axes of the associated shafts, bearings being interposed between said eccentric portions of said sleeves and said shafts; and means operatively connected to all of said sleeves for simultaneously adjusting the same.

4. In a rotary pellet mill, the combination of: a housing including a plurality of walls defining a chamber and one of said walls incorporating a plurality of openings; a plurality of extrusion rollers in said chamber each located adjacent one of said openings and mounted on a drive shaft extending through the associated opening; adjustment sleeves having eccentric portions encompassing said shafts, said sleeves being located entirely externally of said chamber, bearings being interposed between said eccentric portions of said sleeves and said shafts; means mounted in operative engagement with each of said sleeves for adjusting the same; and locking means mounted on said one wall for preventing relative rotation between said sleeves and said housing, said locking means being constituted by a plurality of locking collars one each of which is disposed in encompassing relationship with one of said sleeves.

5. In a pellet mill, the combination of: a housing defining a chamber and having a wall incorporating a plurality of material inlet openings and a pellet outlet opening; a rotary die mounted in said chamber; a plurality of extrusion rollers in said chamber encompassed by said die, one of said rollers being located adjacent each of said inlet openings; and material feeding mechanism mounted in operative relationship with said housing and including a plurality of rotary feeding members having inner extremities projecting through said inlet openings and located in said chamber, said feeding mechanism also including a hopper for receiving pelletizable material and conveyor means at the outlet of said hopper for delivering said material to said rotary feeding members through said inlet openings.

6. In a pellet mill, the combination of: a housing defining a chamber; a plurality of extrusion rollers mounted in said chamber and having drive shafts connected thereto; common drive means connected to said shafts; a rotary die mounted in said chamber and supported upon said rollers, said die including a track on the interior periphery thereof for the reception of the peripheries of said rollers; and exhaust means connected to said housing and communicating with said chamber for exhausting surplus material from said chamber.

7. In a rotary pellet mill, the combination of: a housing defining a chamber; a plurality of rotatable extrusion rollers mounted in said chamber; a plurality of drive shafts extending into said chamber, one of which is connected to each of said rollers; and a partition member mounted centrally of said chamber and having a plurality of recesses shaped to receive said rollers, the walls of said recesses being spaced from said rollers to prevent said rollers from binding thereupon.

8. In a rotary pellet mill, the combination of: a housing defining a chamber; a plurality of rotatable extrusion rollers mounted in said chamber; a plurality of drive shafts extending into said chamber, one of which is connected to each of said rollers; a partition member mounted centrally of said chamber and having a plurality of recesses shaped to receive said rollers, the walls of said recesses being spaced from said rollers to prevent said rollers from binding thereupon; and scraper means mounted on said partition adjacent each roller for scraping the surface of an associated roller.

References Cited in the file of this patent
UNITED STATES PATENTS

| | | |
|---|---|---|
| 2,044,376 | Webster | June 16, 1936 |
| 2,167,900 | Meakin | Aug. 1, 1939 |
| 2,336,114 | Meakin | Dec. 7, 1943 |
| 2,689,974 | Meyer | Sept. 28, 1954 |
| 2,700,940 | Johnson | Feb. 1, 1955 |
| 2,764,951 | Fisher | Oct. 2, 1956 |
| 2,870,481 | Bonnafoux | Jan. 27, 1959 |